No. 717,685. PATENTED JAN. 6, 1903.
W. N. ICKES.
TEA KETTLE COVER.
APPLICATION FILED APR. 15, 1902.
NO MODEL.
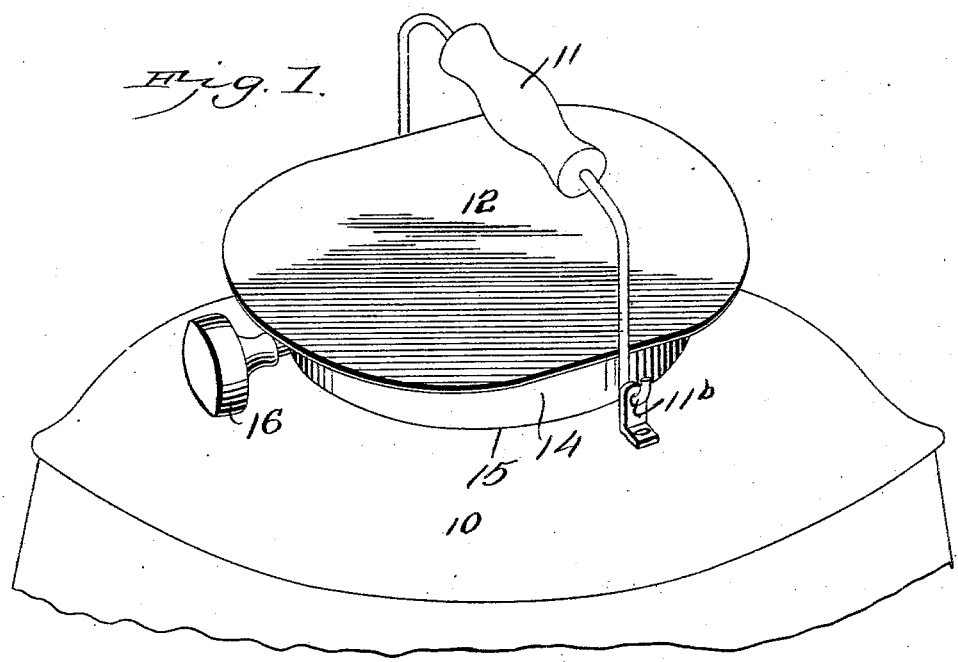
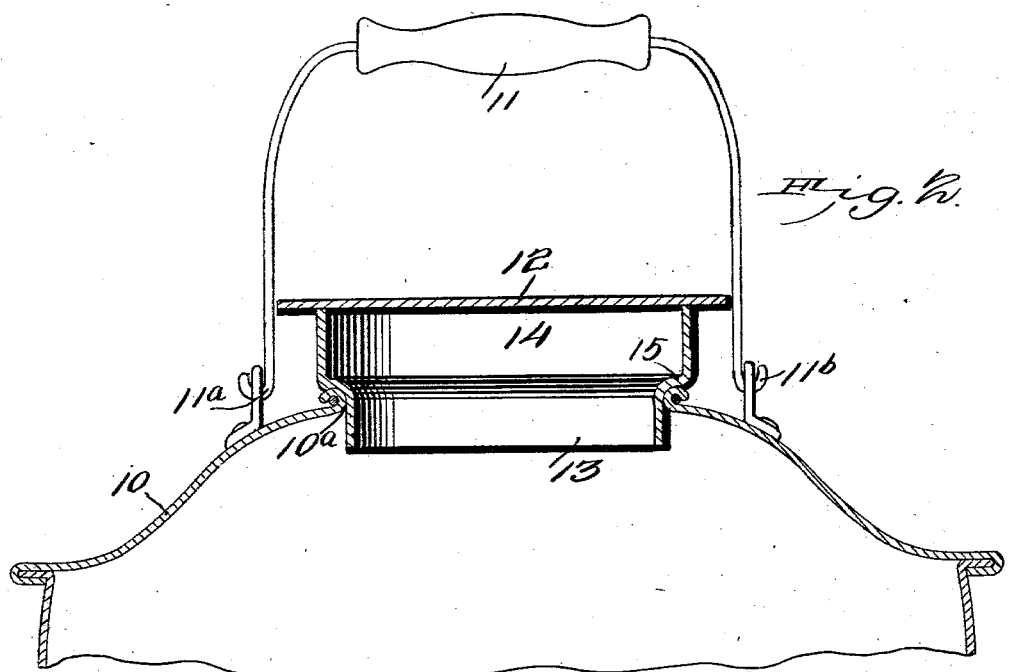
Witnesses
Walter N. Ickes, Inventor

UNITED STATES PATENT OFFICE.

WALTER N. ICKES, OF CENTER, COLORADO.

TEA-KETTLE COVER.

SPECIFICATION forming part of Letters Patent No. 717,685, dated January 6, 1903.

Application filed April 15, 1902. Serial No. 103,011. (No model.)

*To all whom it may concern:*

Be it known that I, WALTER N. ICKES, a citizen of the United States, residing at Center, in the county of Saguache and State of Colorado, have invented a new and useful Tea-Kettle Cover, of which the following is a specification.

This invention relates to covers for tea-kettles and the like; and it has for its object to provide a device of this class upon which dishes and other utensils may be conveniently supported for the purpose of keeping the same warm.

With this end in view the invention consists in a kettle-cover having a flat top and provided with a depending shouldered flange to engage the mouth of the tea-kettle, as will be hereinafter fully described, and particularly pointed out in the claim.

In the drawings illustrative of the invention, Figure 1 is a perspective view of the cover and a portion of the upper part of a tea-kettle with the improved cover in position thereon. Fig. 2 is a vertical section of the same.

The device may be applied to any style or size of tea-kettle or to other similar vessels, but is more particularly applicable to tea-kettles, and a portion of the upper part of such a vessel is represented at 10, with the usual mouth $10^a$ and handle 11, the latter engaging the kettle by the usual ears $11^a$ $11^b$.

The improved cover consists of the flat top 12, a depending flange 13, adapted to engage the mouth $10^a$ of the kettle, and a hot air or steam chamber 14 between the flange 13 and the cover 12, as shown. The chamber 14 is connected to the flange 13 by an annular ring 15, whereby a shoulder is formed to support the cover, as shown in Fig. 2. The cover 12 is extended toward the ears $11^a$ $11^b$ as far as the distance between them or the handle-bail will permit, as shown, but is extended at other points to a greater distance, whereby the area is enlarged without interfering with the proper use of the handle and its bail. A lifting-handle 16 will be attached, preferably, to one side of the drum 14, as shown, by which means the cover may be handled.

By this simple device means are provided for supporting dishes or other utensils upon the cover 12 in a position to receive the benefit of the heat radiated from the hot or boiling water in the kettle below and which has heretofore been wasted.

The drum 14 serves a twofold purpose—first, as a recipient of the hot air and steam from the water below, and thereby providing an increased volume of radiation, and, second, as a means of extending the cover 12, so that large vessels or dishes supported on the cover will not be interfered with by the ears $11^a$ $11^b$. By this simple means the volume of heretofore wasted heat radiated from the kettle may be utilized in warming dishes of cooked food and for other purposes where a moderate degree of heat is required.

The cover takes up very little more room than the ordinary cover and no room which is otherise required.

By the construction of my improved tea-kettle cover with the shoulder 15, whereby the cover is supported upon the mouth of the kettle, results another advantage which should not be lost sight of. Kettle-covers of ordinary construction are supported at this point by flanges extending from the annular rims comprising such covers, the heads and rims of the covers being usually connected by solder. The consequence is that they will very soon rust at this point of contact, and the rims will become separated from the heads, thus destroying the cover. By my improvement the shoulder 15 is solid, being usually spun or struck up from the metal and is therefore not liable to rust.

Having fully described my invention, what I claim is—

As an article of manufacture, a kettle-cover composed of a flat head forming a supporting-disk and provided on its under side at a distance from its periphery with a depending flange having an annular shoulder formed thereon whereby the lower end of said flange is contracted to engage the mouth of a kettle, substantially as set forth.

In testimony that I claim the foregoing as my own I have hereto affixed my signature in the presence of two witnesses.

WALTER N. ICKES.

Witnesses:
 DAN. H. STALEY,
 WESLEY STALEY.